United States Patent [19]
Ohya

[11] Patent Number: 5,800,064
[45] Date of Patent: Sep. 1, 1998

[54] LINEAR MOTION GUIDE UNIT WITH ELASTIC DEFORMABLE SLEEVES

[75] Inventor: Yasumasa Ohya, Gifu, Japan

[73] Assignee: Nippon Thompson Co., Ltd., Tokyo, Japan

[21] Appl. No.: 925,175

[22] Filed: Sep. 8, 1997

Related U.S. Application Data

[63] Continuation of Ser. No. 707,588, Sep. 5, 1996, abandoned.

[30] Foreign Application Priority Data

Sep. 6, 1995 [JP] Japan .................... 7-252019

[51] Int. Cl.$^6$ .................................... F16C 29/06
[52] U.S. Cl. ............................. 384/44; 384/45
[58] Field of Search ....................... 384/43, 44, 45, 384/13

[56] References Cited

U.S. PATENT DOCUMENTS 4,239,299  12/1980  Hoffmann et al. ................ 384/43

FOREIGN PATENT DOCUMENTS 427405   5/1992  Japan .
4194413  7/1992  Japan .
5141415  6/1993  Japan .

Primary Examiner—Daniel P. Stodola
Assistant Examiner—Matthew A. Kaness
Attorney, Agent, or Firm—Browdy and Niemark

[57] ABSTRACT

In this linear motion rolling guide unit, return passages are formed by sleeves fitted in return bores in the casing, and these sleeves are made elastically deformable, so that they can offset the slide resistance of rolling elements and secure the smooth rolling of the rolling elements. In this linear motion rolling guide unit, sleeves extending over the whole length of the return bores in the casing and forming return passages for cylindrical rollers are fitted in the return bores, and clearances, in which the sleeves can be elastically deformed, are provided between the inner surfaces of the return bores and the outer surfaces of the smaller-diameter portions of the sleeves. The sleeves are provided with slits extending in the longitudinal direction thereof, and both end portions of the sleeves are held in the return bores in the casing.

5 Claims, 6 Drawing Sheets

LINEAR MOTION GUIDE UNIT WITH ELASTIC DEFORMABLE SLEEVES

This application is a continuation of parent application Ser. No. 08/707,588, filed Sep. 5, 1996, now abandoned in favor of the present application.

BACKGROUND OF THE INVENTION

1. Field of the Invention:

This invention relates to a seal-carrying linear motion rolling guide unit applied to a cutting machine, a grinding machine and a wood working machine, and capable of being installed simply in an existing machine as well.

2. Description of the Prior Art:

A conventional linear motion rolling guide unit comprises a track rail provided with raceway grooves in both of the longitudinal side surfaces thereof, a casing provided with raceway grooves in the portions thereof which are opposed to the raceway grooves in the track rail, and capable of being moved relatively to the track rail, end caps fixed to both ends of the casing, and rolling elements fitted in the spaces defined by the raceway grooves in the track rail and those in the casing. A slider relatively moved on the track rail has the casing and end caps.

Figure 14:
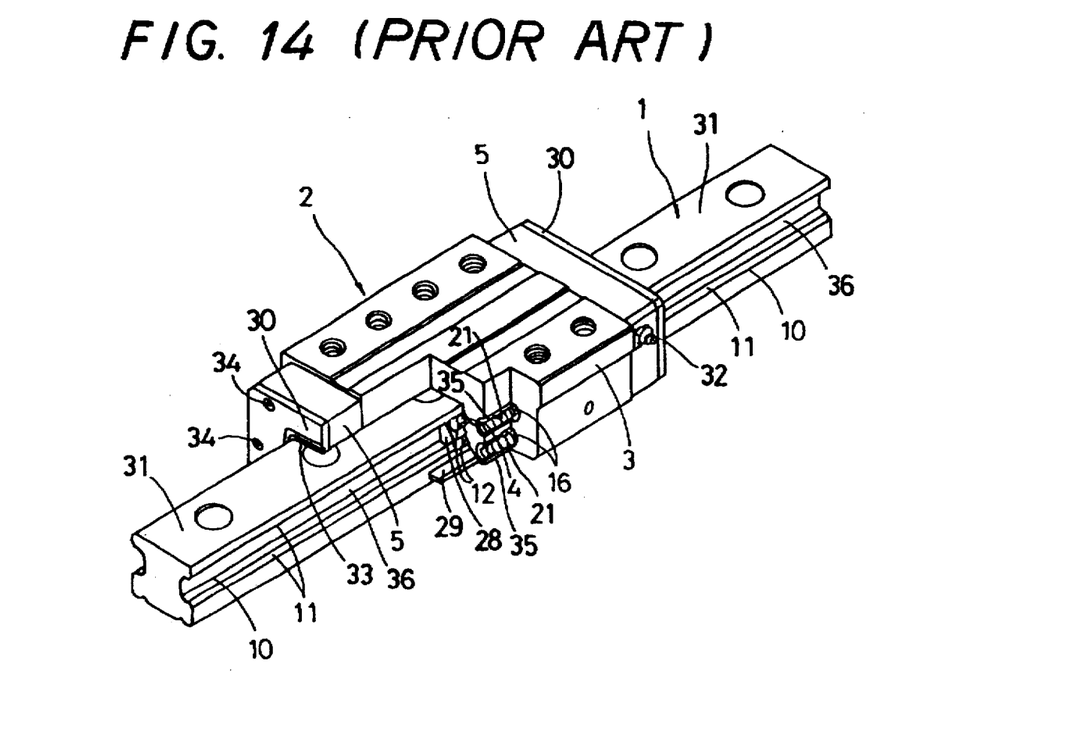
FIG. 14 is a perspective view of an example of a conventional linear motion rolling guide unit.
Figure 15:
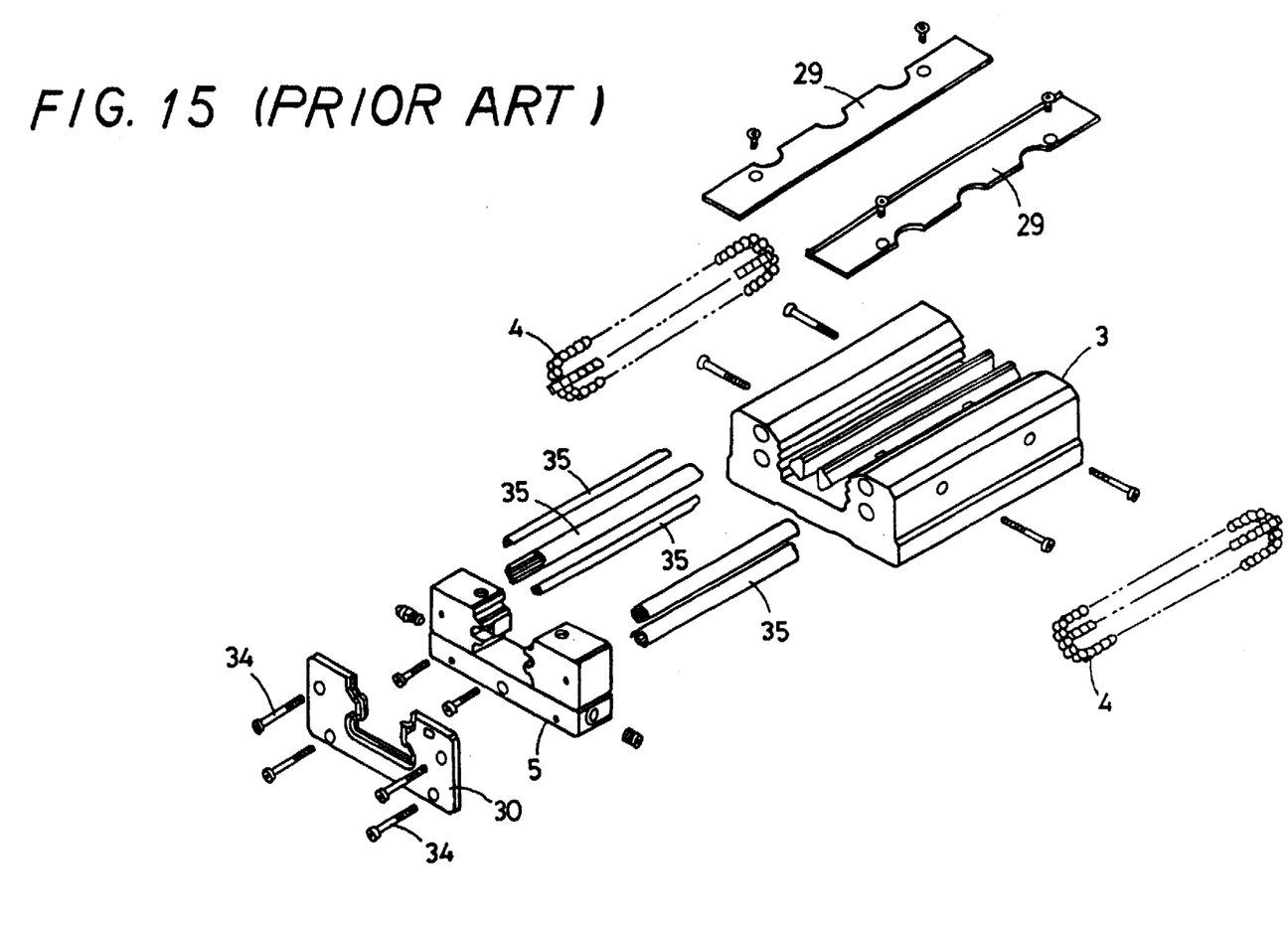
FIG. 15 is an exploded view showing a part of the linear motion rolling guide unit of FIG. 14.

There is a known linear motion rolling guide unit shown in FIGS. 14 and 15. This linear motion rolling guide unit comprises a track rail 1 provided with upper and lower raceway surfaces 11 in the longitudinally extending track rail groove 36 formed in body of the longitudinal side surfaces 10 thereof, and a slider 2 saddled slidably on the track rail 1. The slider 2 has a casing 3 capable of being slid relatively to the track rail 1 and provided with raceway surfaces 12 in the portions thereof which are opposed to the raceway surfaces 11, cylindrical rollers 4 constituting a plurality of rolling elements rolling relatively movably between the opposed raceway surfaces 11, 12, and end caps 5 fixed to both ends of the casing 3 which ends are in the sliding direction, i.e. longitudinal direction thereof. The end caps 5 have side seals 30 which are provided with lip portions 33 attaining the longitudinal sealing of the clearances between an upper surface 31 of the track rail 1 and the slider 2, and which are attached to the end caps with screws 34, and nipples 32 used for supplying a lubricant to the cylindrical rollers 4 and between sliding surfaces of the track rail 1 and slider 2 and fixed to the end caps. In order to prevent the cylindrical rollers 4 from falling from the casing 3, retaining members 28 are fixed to the casing 3 so that the retaining members 28 enclose the cylindrical rollers 4. In order to seal the clearances between the casing 3 and end caps 5 and both of the longitudinal side surfaces, lower seals 29 are attached to the lower surfaces of the end caps 5 and casing 3. The casing 3 is provided with return bores 21 for circulating the cylindrical rollers 4, i.e. rolling elements, and longitudinal hollow-carrying sleeves 35 forming no-load raceways constituting return passages 16 for the cylindrical rollers 4 and extending over the whole length of the return bores 21 are fitted therein.

The examples of such a linear motion rolling guide unit include the four-groove endless linear motion rolling guide unit disclosed in Japanese Patent Laid-Open No. 194413/1992. This four-groove endless linear motion rolling guide unit comprises a track rail provided with raceway grooves formed in the longitudinal side wall surfaces and having upper and lower raceway surfaces, and a slider saddled on the track rail and capable of being slidingly moved. The slider comprises a casing provided with return bores, and end caps fixed to both ends of the casing and provided with direction changing passages. Two-split sleeves comprising a synthetic resin and forming return passages on which the cylindrical rollers move back are fitted in the return bores in the casing.

Japanese Patent Publication No. 27405/1922 discloses elastic spacers used for a rolling bearing for an endless linear motion apparatus. These elastic spacers are installed at regular intervals in place of roller type rolling elements so as to offset the clearances among the rolling elements.

In the roller bearing for a linear motion apparatus disclosed in Japanese Patent Laid-Open No. 141415/1993, guide linings (sleeves) are inserted in return passages.

When a slider in a conventional linear motion rolling guide unit in which rolling elements are endlessly circulated is moved slidingly along a track rail, a sliding resistance, i.e. a friction resistance scatters, and a sliding motion of the slider lacks smoothness. It is considered that the cause of this inconvenience resides in the following. Since the rolling elements are endlessly circulated from the loaded raceways defined by the raceway grooves in the track rail and those in the slider and through the direction changing passages formed in the end caps and no-load circulating passages constituting the return passages formed in the casing, they enter and leave loaded raceways narrowed due to the rolling elements which receive a load and no-load circulating passages in which clearances exist between the rolling elements and the inner surfaces of the same passages, to cause the variation of friction resistance to occur in a rolling state of the rolling elements.

In order to reduce the variation of friction with respect to the rolling elements occurring in boundary regions between loaded raceways and no-load circulating passages in a conventional guide unit and smoothen the sliding movements of the rolling elements, the following measures are adopted.

(1) The inlets and outlets of the loaded raceways between raceway grooves, in other words, the inlets and outlets of the raceway grooves in the casing of the slider are subjected to crowning so that the inlets and outlets have a smooth shape to permit the rolling elements to enter and leave the same easily.

(2) When the rolling elements comprise balls, the above measures (1) alone can achieve smooth sliding movements of the rolling elements. However, when the rolling elements comprise rollers including cylindrical rollers, it is difficult to achieve ideal sliding movements thereof since the rollers have angular portions.

When the rolling elements comprise rollers, such a problem is solved by providing elastic spacers among the rollers as disclosed in, for example, Japanese Patent Publication No. 27405/1992 referred to above.

It is technically difficult by the measures (1) to ideally crown the inlets and outlets of the raceway grooves in the casing so that friction variation do not occur. The measures (2) have no problems when elastic spacers roll with cylindrical rollers in the no-load circulating passages. However, the rolling elements comprising mixtures of cylindrical rollers and elastic spacers roll in the loaded raceways, the cylindrical rollers only receive a load. Therefore, the load capacity further decreases as compared with that in a case where elastic spacers are not mixed with the cylindrical rollers, and load variation occurs. This hampers a smooth sliding movement of the slider.

SUMMARY OF THE INVENTION

An object of the present invention is to solve these problems, and provide a linear motion rolling guide unit formed so that smooth sliding movements of rolling elements are attained by forming the sleeves, which are inserted in the return passages, to structures having such an elasticity that permits the sleeves to be deformed by the external force of the rolling elements so as to make the rolling elements, especially, cylindrical rollers roll circulatingly and smoothly.

The present invention relates to a linear motion rolling guide unit having an elongated track rail provided with raceway surfaces on longitudinal side portions thereof, a casing provided with raceway surfaces opposed to those of the track rail, end caps fixed to both of the longitudinal ends of the casing, and rolling elements rolling in the raceways between the raceway surfaces of the track rail and casing, the casing being provided with return bores for forming return passages on which the rolling elements move back, the end caps being provided with direction changing passages for changing the direction of movements of the rolling elements from the raceways to the return passages, comprising sleeves inserted in the return bores in the casing and extending over the whole length of the same bores, the sleeves forming the return passages for the rolling elements, clearances in which the sleeves can be elastically deformed being provided between the inner surfaces of the return bores and the outer surfaces of the sleeves.

When these rolling elements comprise cylindrical rollers, the elastically deforming function of the sleeves is displayed.

Each of the sleeves comprises a pair of identical divisional sleeve members obtained by dividing a cylindrical body into two longitudinally at the rolling surface thereof on which the rolling elements roll.

The sleeves are formed cylindrically and have longitudinally extending return passages therein.

The sleeves are provided with slits extending in the longitudinal direction thereof on the axes of rolling of the rolling elements rolling in the return passages, in such a manner that the sleeves can be elastically deformed.

A lubricant is stored in the clearances between the sleeves and the return bores in the casing, and the rolling elements are lubricated through the slits in the sleeves.

Each of the sleeves is formed at both end portions thereof to a larger diameter so that both end portions are fitted in the return bores in the casing to fix these end portions to both end portions of the casing. The intermediate portion of each sleeve is formed to a smaller diameter so as to form clearances, in which the sleeve can be elastically deformed, between the outer surface thereof and the inner surface of the relative return bore.

Both end portions of the sleeve are fitted in engagement recesses joined to the direction changing passages and formed in the end caps, the sleeves being thus fixed to the end caps.

This linear motion rolling guide unit is constructed as described above, in which the sleeves have longitudinally extending slits on the end surface sides of rolling elements, clearances being formed between the outer surfaces of the sleeves and the inner surfaces of the return bores in the casing. Therefore, while cylindrical rollers used as the rolling elements are circulated from loaded raceways to the return passages through the direction changing passages in the end caps, the sleeves are deformed elastically at once by the cylindrical rollers, even when the cylindrical rollers receive a frictional resistance and stall, in a direction in which the rolling surfaces, i.e. guide surfaces of the return passages are expanded. This elastic deformation of the sleeves enables the frictional resistance of the rollers to be evaded, and the cylindrical rollers to roll smoothly in the return passages in the sleeves.

In the linear motion rolling guide unit according to the present invention, the sleeves have longitudinally extending slits on the end surface sides of the cylindrical rollers, and clearances are formed between the outer surfaces of the sleeves and the inner surfaces of the return bores in the casing. Therefore, while the rolling elements are circulated from the loaded raceways to the no-load circulating passages constituting the return passages through the direction changing passages in the end caps, the sleeves are deformed elastically at once, even when the rolling elements receive a frictional resistance and stall, in a direction in which the guide surfaces of the return passages are expanded. This elastic deformation of the sleeves enables the frictional resistance of the rolling elements to be evaded, and the rolling elements to roll smoothly in the return passages.

When each of the sleeves is formed by a pair of divisional sleeve members, the diameter of the sleeve increases radially at the contact surfaces of the two divisional sleeve members by a level corresponding to a maximum width of a clearance therebetween, and this enables the sleeve to be elastically deformed, and its function of offsetting the frictional resistance of the rolling elements to be displayed.

When this linear motion rolling guide unit is used, it is unnecessary to install elastic spacers, which are used in a conventional guide unit of this kind, among the rolling elements, and a decrease in the load capacity and load variation do not occur.

In the linear motion rolling guide unit according to the present invention, the sliding resistance of the rolling elements can be evaded and offset by merely forming clearances between the return bores in the casing and the sleeves fitted in the return bores. Therefore, it is not always necessary that, for example, the raceway surfaces of the casing be subjected to a crowning process unlike those in a conventional rolling guide unit of this kind, and it becomes possible to secure smooth rolling of the rolling elements. It is, of course, clear that, if the raceway surfaces of the casing are subjected to a crowning process, the rolling elements roll more smoothly. When the rolling elements are circulated endlessly in loaded raceways between the raceway surfaces and no-load circulating passages, such as the direction changing passages and return passages, the movements thereof lack smoothness in some cases due to the scatter, i.e. variation of frictional resistance while they are moved slidingly in the loaded raceways. However, in the linear motion rolling guide unit according to the present invention, the variation of the frictional resistance of the rolling elements in the no-load circulating passages during the endless circulation thereof is offset by the elastic force of the slit-carrying sleeves. This enables the rolling of the rolling elements to be done smoothly, and the smoothness of the general rolling operation of the rolling elements to be secured.

DESCRIPTION OF THE PREFERRED EMBODIMENTS:

The embodiments of the linear motion rolling guide unit according to the present invention will now be described with reference to the drawings. This linear motion rolling guide unit has basically the same construction as that shown in, for example, FIGS. 14 and 15 except that the construction of the sleeves is different. Therefore, the same parts are designated by the same reference numerals, and the duplication of the descriptions thereof is omitted.

Figure 8:
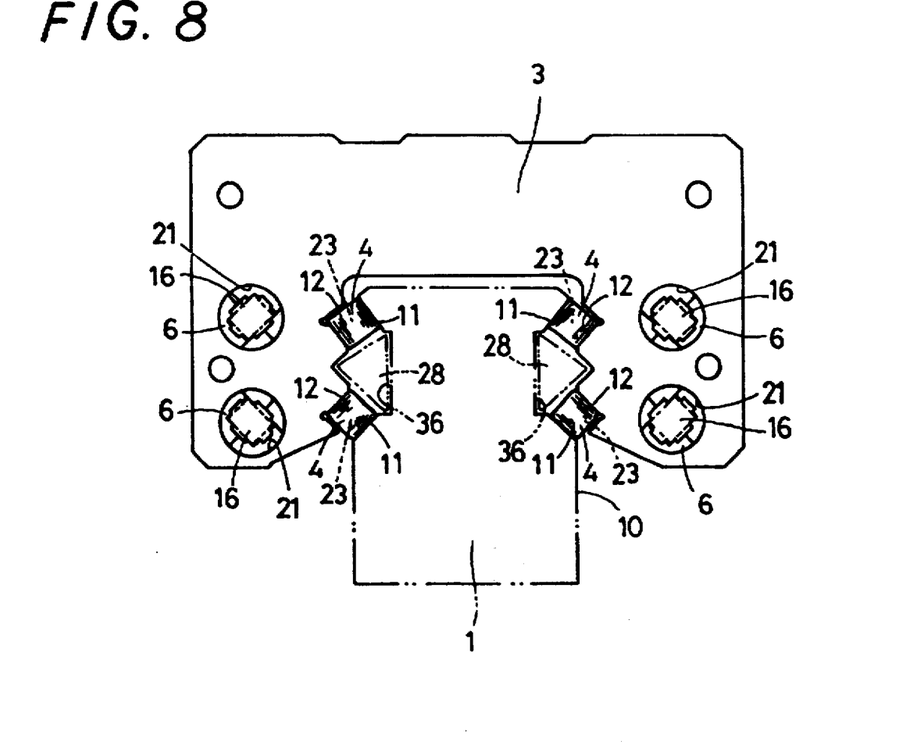
FIG. 8 is an end view showing sleeves fitted in the return bores in a casing.

As shown in FIG. 8 (refer to FIG. 14), the linear motion rolling guide unit according to the present invention has an elongated track rail 1 provided with upper and lower raceway surfaces 11 in the longitudinally extending track rail grooves 36 formed in both of longitudinal wall surfaces 10, a casing 3 provided with raceway surfaces 12 opposed to the raceway surfaces 11, end caps 5 fixed to both of longitudinal ends of the casing 3; cylindrical rollers 4 constituting rolling elements and rolling in raceways 23 formed by the raceway surfaces 11, 12 of the track rail 1 and casing 3, and retainer means for retaining the cylindrical rollers 4.

The retainer means comprise retaining members 28 extending in the longitudinal direction of the casing 3 and adapted to retain the cylindrical rollers 4. The track rail 1 is provided with upper and lower raceway surfaces 11 comprising inclined surfaces, while the casing 3 is provided with upper and lower raceway surfaces 12 comprising inclined surfaces. The raceway surfaces 11 of the track rail 1 are formed along and on the upper and lower sides of track rail grooves 36 extending in the longitudinal direction of the side surfaces 10 thereof.

The retaining members 28 constituting the retainer means are fitted in the track rail grooves 36, and supported in a contacting state on the casing 3. The cylindrical rollers 4 are formed so that they roll in the upper raceways 23 formed between the mutually opposed upper raceway surfaces 11, 12 and in the lower raceways 23 formed in the mutually opposed lower raceway surfaces 11, 12.

The casing 3 is provided with return bores 21 extending in parallel with the raceway surfaces 12. In these return bores 21, sleeves 6 are fitted so that the sleeves 6 extend over the whole length of the return bores 21 and form return passages 16 at which the cylindrical rollers 4 move back.

The end caps 5 are provided with direction changing passages 22 for changing the direction of rolling of the cylindrical rollers 4 from the raceways 23 to the return passages 16.

Figure 11:
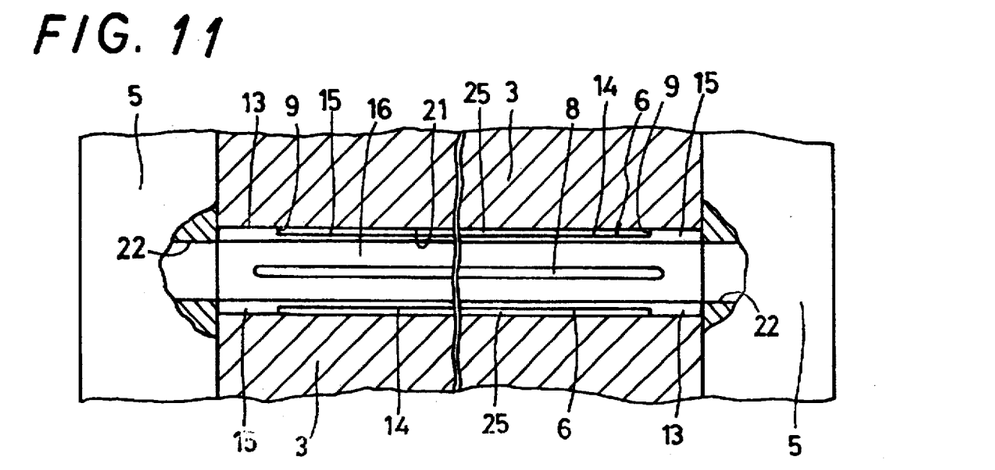
FIG. 11 is a sectional view of an example of a clearance formed by fixing both ends of a sleeve to a casing.

This linear motion rolling guide unit is characterized in that clearances 25 in which the sleeves 6 can be elastically deformed are provided between the inner surfaces of the return bores 21 and the outer surfaces of smaller-diameter portions 14 in intermediate regions of the sleeves 6 as shown in, for example, FIG. 11. Each sleeve 6 comprises larger-diameter portions 13 at both ends thereof and a smaller-diameter portion 14 in a longitudinally intermediate region between the larger-diameter portions 13, and stepped portions 9 are formed between the larger-diameter portions 13 and smaller-diameter portion 14. Accordingly, the sleeve 6 forms clearances at a longitudinally intermediate portion thereof with respect to the outer surface thereof.

Figure 1:
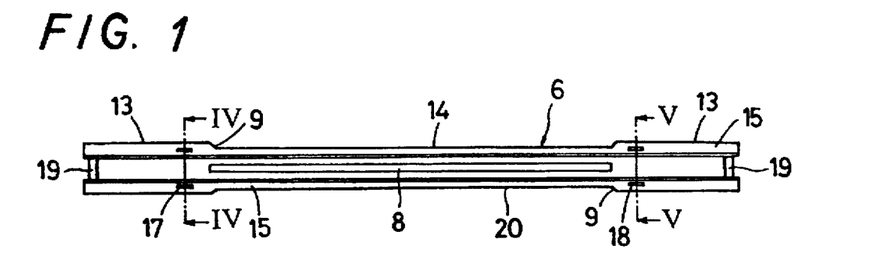
FIG. 1 is a front view of an example of one sleeve member of a two-split sleeve incorporated in the linear motion rolling guide unit according to the present invention.
Figure 2:
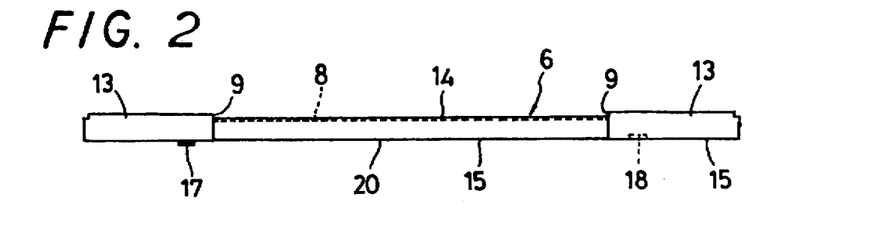
FIG. 2 is a plan view of the sleeve member of FIG. 1.
Figure 3:
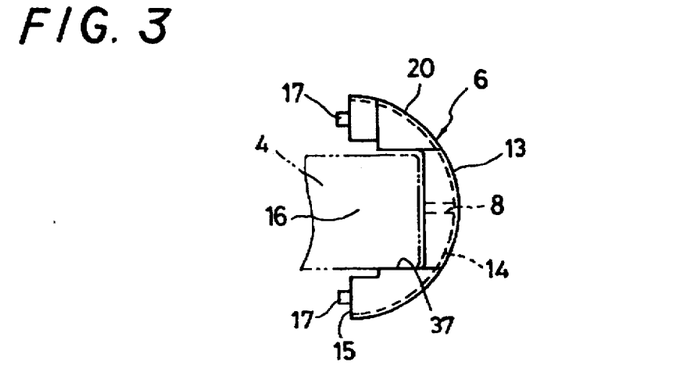
FIG. 3 is a side view of the sleeve member of FIG. 1.
Figure 4:
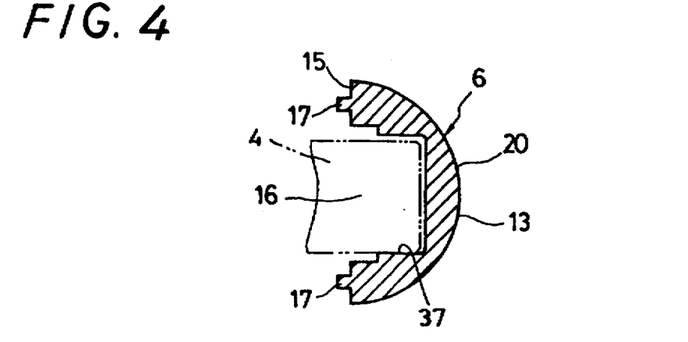
FIG. 4 is a sectional view taken along the line A—A in FIG. 1.
Figure 5:
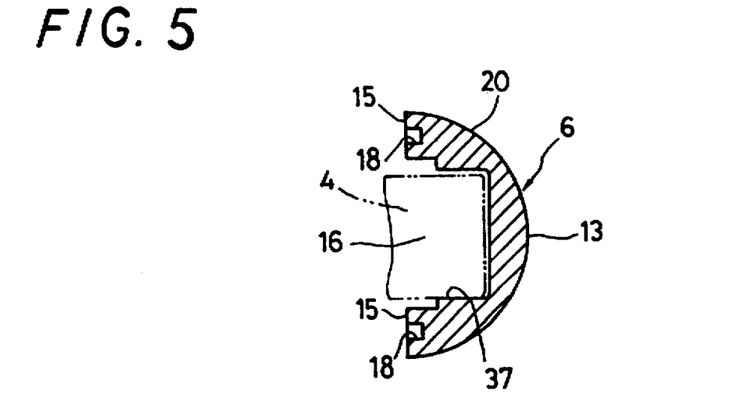
FIG. 5 is a sectional view taken along the line B—B in FIG. 1.
Figure 9:
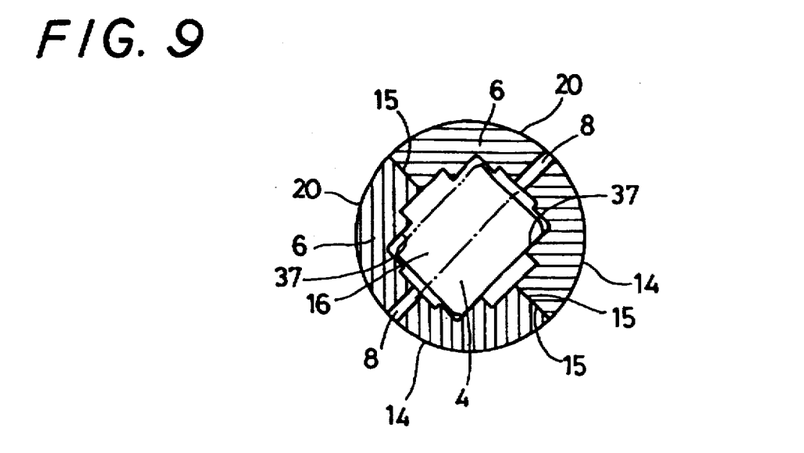
FIG. 9 is a sectional view of a return passage formed by combining together two divisional members of a sleeve.

Each sleeve 6 comprises a pair of identical divisional sleeve members 20 joined together at rolling surfaces 37, along which the cylindrical rollers 4 roll, extending in the longitudinal direction thereof. When the sleeve 6 has two identical divisional members 20, they are aligned with other at their contact surfaces 15 to form a return passage 16. The contact surface 15 of one divisional sleeve member 20 is provided with projections 17 shown in FIG. 4, while the contact surface 15 of the other divisional sleeve member 20 is provided with recesses 18 shown in FIG. 5. When the two divisional sleeve members 20 are aligned with each other at the their contact surfaces 15, the projections 17 are fitted in the recesses 18, whereby these sleeve members are combined with each other. When the sleeve 6 is formed of a pair of identical divisional sleeve members 20, the aligned combined contact portions of their joint surfaces are brought into contact with and separated from each other to enable the return passage 16 to be elastically deformed.

Figure 6:
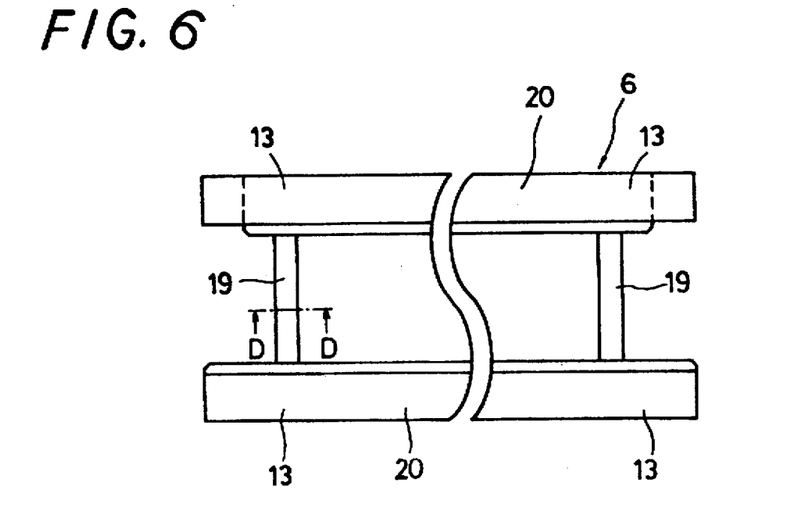
FIG. 6 is an enlarged front view of both end portions of the sleeve member of FIG. 1.
Figure 7:
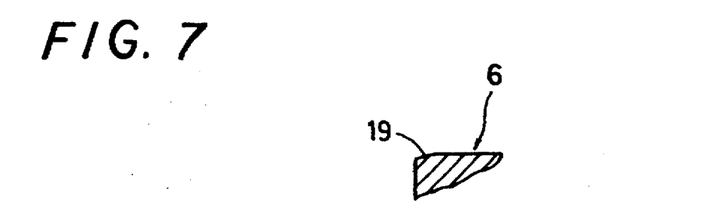
FIG. 7 is a sectional view of a portion of the sleeve member of FIG. 6 taken along the line D—D therein.

Both end portions of the return passage 16 formed in the semicylindrical sleeve member 20 are chamfered 19 to form a smooth passage surface for the purpose of enabling the cylindrical rollers 4 to roll smoothly, as shown in FIGS. 6 and 7.

The sleeve 6 can also be formed by a cylindrical pipe, in which a longitudinally extending return passage 16 is formed, though it is not shown, instead of being formed by two identical divisional members. In the case of the sleeve 6 of a pipe, slits 8 are formed so as to extend in the longitudinal direction thereof in two portions thereof which are spaced from each other in the circumferential direction thereof and on the end surface sides of the cylindrical rollers. In some cases, the slits 8 are formed in a suitable number of portions, for example, 4–6 portions of the sleeve 6 so that the sleeve 6 can be deformed elastically in a proper manner.

In this linear motion rolling guide unit, each sleeve 6 is provided with slits 8 which are on the axis of rolling cylindrical rollers 4 in the return passage 16, and which extend in the longitudinal direction of the sleeve, in such a manner that the sleeve 6 can be elastically deformed. Owing to the provision of the slits 8, a lubricant can be supplied to and discharged from the interior of the sleeve 6 through the slits 8. Therefore, since a lubricant is stored in the clearances 25 between the sleeves 6 and the return bores 21 in the casing 3, the cylindrical rollers 4 are lubricated with the lubricant through the slits 8 in the sleeves 6.

In this embodiment, the sleeves 6 are fixed to the casing 3 as shown in FIG. 11. Referring to FIG. 11, the sleeve 6 is formed by a pair of identical divisional sleeve members 20, the contact surfaces 15 of which are seen, and this drawing shows clearly the relation between the sleeve 6, clearances 25 and return passages 16. In order to fix both end portions of the semicylindrical sleeve members 20 of the sleeves 6 to both ends of the casing 3, the outer diameter of these end portions of the sleeves 6 is increased to form larger-diameter portions 15 so that these portions 13 are fitted into the return bores 21. The intermediate portion of each semicylindrical sleeve member 20 of the sleeves 6 is formed as a smaller-diameter portion 14 via stepped portions 9, boundary portions between the smaller-diameter portion and larger-diameter portions.

Accordingly, clearances 25 are formed between the outer surfaces of the smaller-diameter portions 14 of the sleeves 6 and the inner surfaces of the return bores 21 so that the sleeves 6 can be deformed elastically in the radial direction. When the semicylindrical divisional sleeve members 20 are inserted by press fitting into the return bores 21 in the casing 3 to form return passages 16 with the end caps 5 then attached to both end surfaces of the casing 3, the return passages 16 are connected to the direction changing passages 22, which are formed in the end caps 5, smoothly without causing stepped portions to occur therebetween.

Figure 10:
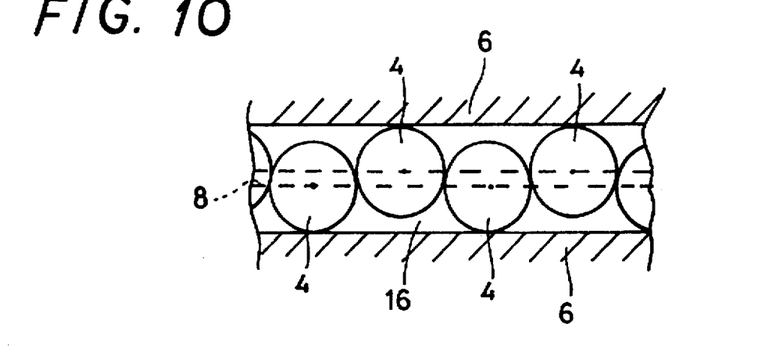
FIG. 10 illustrates the condition of rolling elements rolling in a return passage formed by a sleeve.

The return passages 16 form no-load circulating passages for the cylindrical rollers 4, in which the cylindrical rollers 4 return as they are pushed by the cylindrical rollers 4 on the rear side as shown in FIG. 10. When excessive friction occurs on the cylindrical rollers during this time, the sleeves 6 are deformed elastically with ease by the cylindrical rollers 4 since the sleeves 6 have the slits 8, so that the frictional resistance with respect to the cylindrical rollers 4 is offset to enable the cylindrical rollers 4 to roll smoothly.

Figure 12:
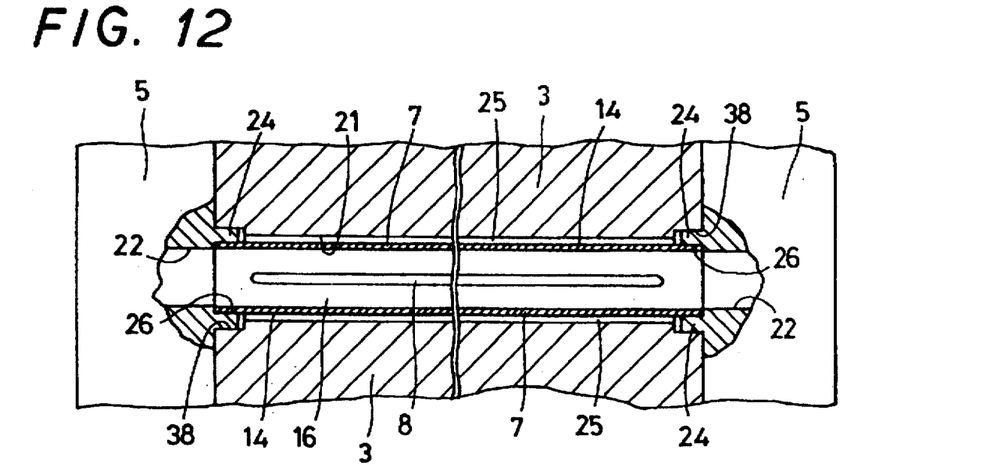
FIG. 12 is a sectional view of another example of a clearance formed by fixing both ends of a sleeve to end caps.

Another embodiment of the linear motion rolling guide unit according to the present invention will now be described with reference to FIG. 12.

This embodiment has the same construction as the above-described embodiment except that the shape of the sleeves and the sleeve fixing structures are different. The sleeves 7 are formed so as to have a constant outer diameter over the whole length thereof. The end caps 5 are provided on the end surfaces thereof with annular projections 24 having engagement recesses 26 joined to the direction changing passages 22. Both end portions of the sleeves 7 are fitted in the engagement recesses 26 in the end caps 5, whereby the sleeves 7 are fixed to the end caps 5. Clearances 25 are formed between the outer surfaces of smaller-diameter portions of the sleeves 7 and the inner surfaces of the return bores 21 in the casing 3 to enable the sleeves 7 to be elastically deformed.

In this embodiment, it is necessary that annular recesses 38 be formed in the casing 3 so as to fit the annular projections 24 provided on the end caps 5 in both end portions of the casing 3. The annular projections 24 are supported in the annular recesses 38 in the casing 3, and can provide very strong engagement recesses 26 for fitting both end portions of the sleeves 7 therein. Moreover, the connection of the direction changing passages 22 in the end caps 5 and the return passages 16 in the sleeves 7 with each other can be effected smoothly, and the smooth rolling of the cylindrical rollers constituting rolling elements is made possible. Each sleeve 7 can be formed by a cylindrical sleeve member in the same manner as in the above embodiment, or a pair of semicylindrical divisional sleeve members.

Figure 13:
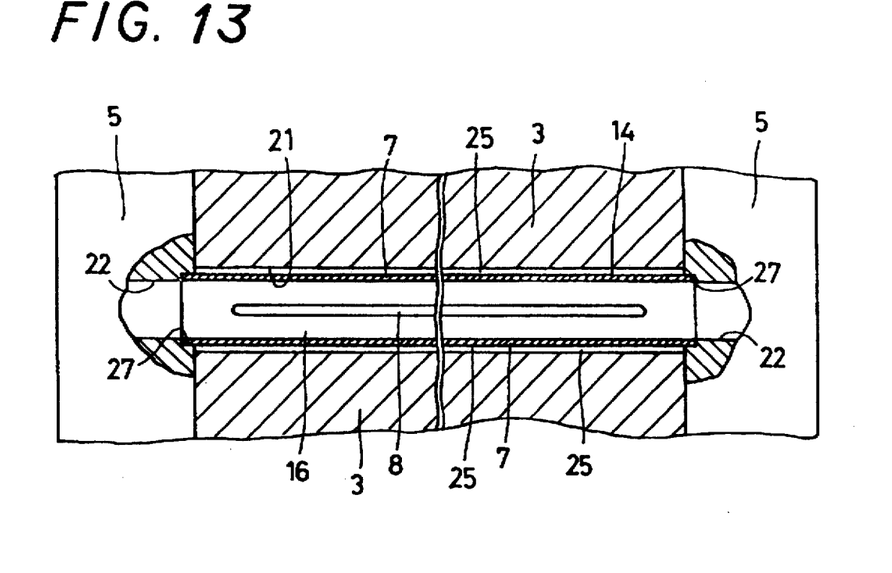
FIG. 13 is a sectional view of still another example of a clearance formed by fixing both ends of a sleeve to end caps.

Still another embodiment of the linear motion rolling guide unit according to the present invention will now be described with reference to FIG. 13. This embodiment has the same construction as the second embodiment except that the sleeve fixing structure is different. The sleeves 7 are formed straight, i.e., so as to have a constant outer diameter over the whole length thereof. The end caps 5 are provided in the end surfaces thereof with large-diameter engagement recesses 27 joined to direction changing passages 22. Both end portions of the sleeves 7 are fitted in the engagement recesses 27 formed in the end caps 5, whereby the sleeves 7 are fixed to the end caps 5. Clearances 25 are formed between the outer surfaces of smaller-diameter portions 14 of the sleeves 7 and the inner surfaces of return bores 21 in the casing 3 to enable the sleeves 7 to be elastically deformed. Each sleeve 7 can be formed by a cylindrical sleeve member in the same manner as in each of the above-described embodiments, or a pair of semicylindrical divisional sleeve members.

What is claimed is:

1. A linear motion rolling guide unit comprising
a track rail provided with first raceway surfaces on longitudinal side portions thereof, a casing provided with second raceway surfaces opposed to said first raceway surfaces, end caps fixed to both longitudinal ends of said casing, rolling elements rolling in raceways between said first and second raceway surfaces of said track rail and said casing, return bores provided in said casing so as to form return passages in which said rolling elements move back, and direction changing passages provided in said end caps and comprising means to change directions of movement of said rolling elements between said raceways to said return passages, and comprising sleeves fitted in said return bores in said casing and extending over the whole length of said return bores, said return passages for said rolling elements being formed in an inner surface of said sleeves, and including cylindrical clearances in which said sleeve can be elastically deformed by external forces of said rolling elements being provided cylindrically and longitudinally between inner surfaces of said return bores and outer surfaces of said sleeves;

wherein said sleeves are formed cylindrically and have longitudinally extending return passages therein, wherein each of said sleeves comprises a pair of identical divisional sleeve members obtained by dividing a cylindrical body into two longitudinally at portions thereof which form rolling surfaces on which said rolling elements roll, and wherein each of said divisional sleeve members is provided with slits extending in the longitudinal direction thereof on the axes of rolling of said rolling elements rolling in said return passages in such a manner that said sleeves can be elastically deformed.

2. A linear motion rolling guide unit according to claim 1, wherein a lubricant is stored in said clearances between said sleeves and said return bores in said casing, said rolling elements being lubricated through said slits in said sleeves.

3. A linear motion rolling guide unit according to claim 1, wherein each of said sleeves is formed at both end portions thereof to a larger diameter so that said both end portions are fitted in said return bores in said casing to fix said end portions to both end portions of said casing, a longitudinally intermediate portion of said sleeve being formed to a smaller diameter so as to form clearances, in which said sleeve can be elastically deformed, between an outer surface thereof and an inner surface of the relative return bore, stepped portions being formed in boundary regions between said larger-diameter portions and said smaller-diameter portion.

4. A linear motion rolling guide unit according to claim 1, wherein both end portions of said sleeves are fitted in engagement recesses joined to said direction changing passages formed in said end caps, whereby said sleeves are fixed to said end caps.

5. A linear motion rolling guide unit according to claim 1, wherein said rolling elements are cylindrical rollers.

* * * * *